Jan. 9, 1934.  P. BOOTH  1,942,948
SCREEN
Filed Jan. 5, 1931   2 Sheets-Sheet 1

INVENTOR:
PERCY BOOTH
BY:
Kuege, Boyce + Bakelau
ATTORNEYS

Jan. 9, 1934.   P. BOOTH   1,942,948
SCREEN
Filed Jan. 5, 1931   2 Sheets-Sheet 2

INVENTOR
PERCY BOOTH
BY
Ruge, Boyer + Bakelar
ATTORNEYS

Patented Jan. 9, 1934

1,942,948

UNITED STATES PATENT OFFICE 1,942,948

SCREEN

Percy Booth, Warrington, England

Application January 5, 1931, Serial No. 506,618, and in Great Britain October 2, 1930

2 Claims. (Cl. 209—393)

This invention relates to sieves, screens, strainers, grates or grids for sifting, screening, sorting, draining, straining or filtering purposes, and for wet or dry material, and refers especially to sieves, screens, strainers, grates or grids (hereinafter for brevity simply called sieves or screens) formed of a plurality of bars or wires of angular cross section placed side by side parallel to each other so as to leave narrow longitudinal slots, meshes or interstices between the bars or wires, these slots or meshes enlarging downwards. Sieves or screens of this kind, which are largely used, for instance, for draining or de-watering slurries, as in coal washing, or for dressing ores and minerals, and are operated with a reciprocating or jigging motion, usually consist of a plurality of bars or wires of angular cross-section (which are generally called wedge bars or profile bars or wires) connected together side by side in any suitable way, as for instance by crossbars or pins passed through holes in the bars or through loops formed at intervals on the under side of the bars or wires.

These profile bars or wedge wires are made with a flat, rounded, or ridged top, forming the actual sieving or screening surface, but hitherto the bars or wires have been of the same cross-section throughout their entire length, and usually also the screening surface has been in the same plane throughout the length of the bars, or in the intervals between the loops where loops are used. It is found that when such sieves or screens are used in draining slurries and other wet material, a good deal of liquid is conducted to and carried over the end of the screen which should have been drained off through the slots or meshes.

According to my invention, instead of making these bars or wires to give a level or plain screening or sifting surface throughout their entire length, I propose to vary the level or plane of the screening or sifting surface longitudinally of the bars or wires by varying the cross-section of the top or working surface longitudinally of the bar or wire, that is, the cross-section is varied at different points in the length of the bar, and there may be any desired number of changes of section in the length of the bar or wire. Thus, for example, I may have a gradually altering section, or any suitable number of alterations of section may take place in the length between the cross bars or other desired intervals longitudinally. These variations in the cross-sectional contour of the top or working surface of the bars or wires, ranging from the minimum to the maximum elevation or projection above the plane of the top of the meshes or slots, may be arranged to run all in the one direction, or alternately in reverse directions, or in a reverse direction in alternate bars, or other desired combination. In other words, by this mode of construction the bars or wires have, in effect their top or working surface provided at intervals with projections or raised portions, and such projections or raised portions may be either tapered longitudinal or non-tapered if desired.

The invention will be further described with reference to the accompanying drawings, which illustrate, by way of example, portions of sieves made according to my invention. In these drawings:—

Figure 6 also shows how ordinary bars may be intercalated in the construction of the sieve or screen.

Figure 1:
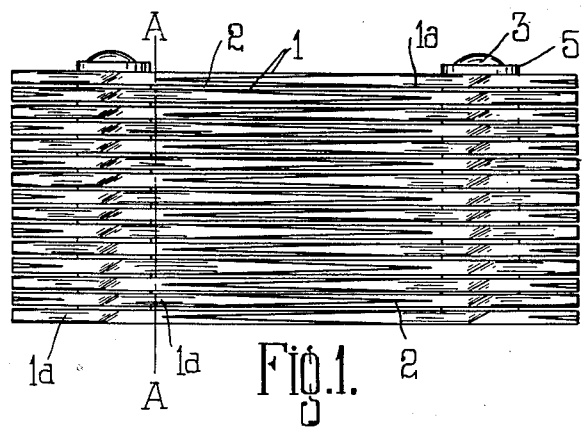
Figure 1 is a plan view of a portion of a sieve or screen, in which the upper part of the component profile bars or wedge wires is made of gradually altering section longitudinally between the cross connections, or in other words, the top of the bar is provided with longitudinally tapered projections, which run in opposite directions in alternate bars.

Referring to the drawings, 1 indicates the profile bars or wedge wires, a part only of the length of which is shown. These bars or wires are placed side by side parallel to each other, and secured together so as to leave narrow longitudinal parallel slots, meshes or interstices 2 between the bars or wires of which the sieve or screen is built up. The slots or meshes owing to the wedge form of the bars or wires increase in width downwards. The bars or wires in the examples shown in the drawings are fastened together in known manner by pins or rivets 3 passed through loops 4 formed at intervals on their lower side. 5 denotes washers. It is to be understood, however, ever, that the bars may be fastened together to form the sieve or screen in any other suitable or known manner. The top of the bars, which forms the actual sifting or screening surface, may be of flat, rounded, ridged or other desired form in cross-section.

Figure 3:
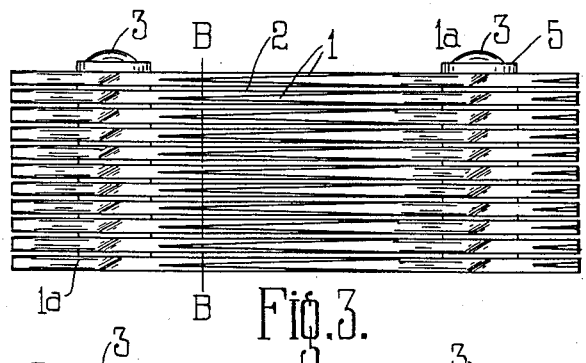
Figure 3 is a plan view of a portion of a sieve or screen surface in which the longitudinally tapered projections run all in the same direction.
Figures 2, 4:
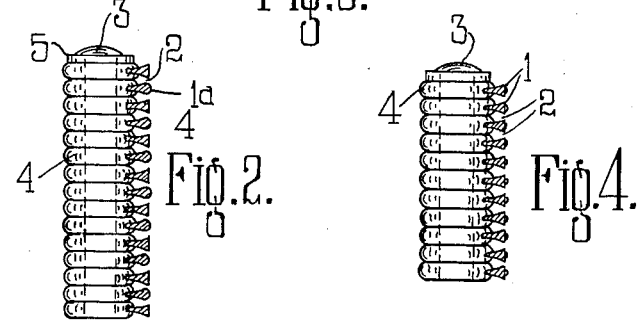
Figure 2 is a cross-section on the line A—A of Fig. 1.
Figure 4 is a corresponding section on the line B—B of Fig. 3.

Now by my invention I vary the level or plane of the sifting or screening surface longitudinally of the bars or wires by varying the cross-section of the top or working surface longitudinally of the bar or wire. In Figs. 1 and 2 I show bars 1 in which the cross-section gradually alters in the length between the cross connections. Thus the bar at one part of its length may be of rounded or arched section, as indicated at 1ᵃ, or other desired cross-sectional form, and in a longitudinal direction this cross-sectional contour gradually changes by diminishing in height and width, i. e. tapers longitudinally, until it becomes merely a low central, longitudinally-tapering rib on a flat surface, into which the rib finally merges. It will be seen that in the arrangement shown in Figs. 1 and 2 these variations in the cross-section of the bar run in reverse directions in alternate bars, whilst in Figs. 3 and 4 they run all in the same direction.

Figure 5:
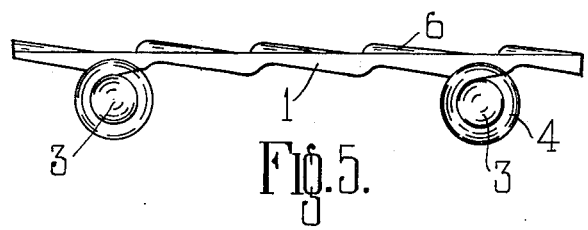
Figures 5 and 6 are respectively, a side elevation and plan of a modification in which there are three longitudinally tapered projections on the bars in the intervals between the cross connections.
Figure 6:
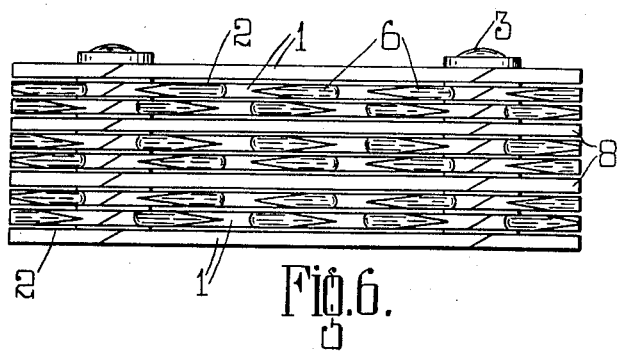

There may be two or more sequences of such variations of cross-section in the length between the cross connections, or at other desired intervals longitudinally of the bar. This is shown in Figs. 5 and 6, where there are three sequences of such variations in the length of the bar between the loops 4. The arrangement here is, in effect, that of a flat-topped bar provided with three longitudinally tapering projections, marked 6 in the drawings.

Further, sieves or screens may be constructed in which ordinary bars having a flat, arched, or other top surface may be arranged to alternate with bars or wires with a top surface made in accordance with my invention. This is shown in Fig. 6, where ordinary bars 8 with a flat top are intercalated between the pairs of bars having longitudinally tapered projections 6.

Figure 7:
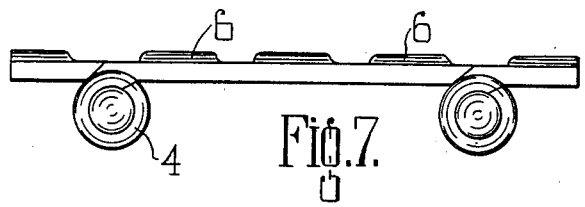
Figure 7 is a side elevation of a fragment of a profile bar or wedge wire in which non-tapered projections are used.

I do not limit myself to the projections or raised portions being tapered longitudinally, as non-tapered projections of any suitable form may also be used if desired, as, for instance, those indicated in Fig. 7.

The effect of varying the cross-section of the top of the bars longitudinally in the manner above described is to form a sinuous or zigzag groove superimposed on the surface of the sieve or screen, the effect of which is to ensure the material passing over the meshes, slots or interstices 2 in a sinuous or zigzag path, thus preventing any tendency when draining wet material for water or other liquid to be conducted to the end of the sieve or screen as in bars or wires having a flat upper surface, or along the grooves of ridge-topped bars in which the ridge runs uninterruptedly the whole length of the screen or sieve.

Further, the effect of my construction is similar to that given by slots or meshes placed obliquely at an angle to the line of travel of the material, and in the case of swinging or jigging sieves the zigzagging effect produced is equal or similar to a sieve having an additional lateral jigging or gyrating movement, the advantages of which are well known.

In cases where wires or bars such as I have described are not arranged alternately, the effect is similar as regards conducting the drainage over meshes or slots placed at an angle to the line of flow, as just referred to, but in addition, in the case of sieves having a jigging motion, a squeezing effect is exerted on the material by the multiplicity of inclined wedge surfaces against which the material is moving, whereby the drainage efficiency is increased, and further any backward travel of the material, and consequent wear on the sieve, which takes place in ordinary jigging sieves is entirely or largely obviated in my sieve by the checking action produced by the surface of the sieve having longitudinally, as it were, a series of serrations or shoulders opposing the retrograde movement of the material.

Although the profile bars or wires shown in the drawings are all shown as having eyes or loops on their lower side for the cross connections, it is to be understood that the invention is, of course, not limited to looped bars.

Sieves, screens or the like may be built up of any desired combination of wedge bars or wires of the types hereinbefore described.

I declare that what I claim is:—

1. A screen of the character described, comprising a plurality of wires of wedge-shape in cross section secured together side by side in parallel relation, the adjacent wires forming between them narrow downwardly diverging slots extending longitudinally of the screen, each of said wires being provided at spaced intervals on its top surface with elongated ribs tapered in width and rising above the plane of the screen and above said slots, each pair of rib provided wires having the ribs of one wire tapered in width in directions opposite the ribs of the other wire and the tops of said wires being in substantially the same plane, the ribs on adjacent wires forming between them longitudinally discontinuous channels above said slots.

2. A screen of the character described, comprising a plurality of wires of wedge-shape in cross section secured together side by side in parallel relation, the adjacent wires forming between them narrow downwardly diverging slots extending longitudinally of the screen, each of said wires being provided at spaced intervals on its top surface with elongated ribs rising above the plane of the screen and above said slots, each pair of rib provided wires having the ribs of one wire tapered in width in directions opposite the ribs of the other wire and the tops of said wires being in substantially the same plane, the ribs on adjacent wires forming between them longitudinally discontinuous channels above said slots, said ribs being tapered in height and width longitudinally of the wires.

PERCY BOOTH.